(12) United States Patent
Shatsky et al.

(10) Patent No.: US 12,105,631 B2
(45) Date of Patent: Oct. 1, 2024

(54) MULTIPLE-INSTANCE WRITE CACHE FOR A STORAGE SYSTEM

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 17/969,875

(22) Filed: Oct. 20, 2022

(65) Prior Publication Data

US 2024/0134799 A1 Apr. 25, 2024
US 2024/0232092 A9 Jul. 11, 2024

(51) Int. Cl.
*G06F 12/0866* (2016.01)

(52) U.S. Cl.
CPC .. *G06F 12/0866* (2013.01); *G06F 2212/1032* (2013.01)

(58) Field of Classification Search
CPC ............ G06F 12/0866; G06F 2212/1032
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |
| 9,514,014 B2 | 12/2016 | Webman et al. |
| 9,875,188 B1* | 1/2018 | Egyed ............... G06F 12/0871 |
| 9,892,045 B1 | 2/2018 | Douglis et al. |

(Continued)

FOREIGN PATENT DOCUMENTS

| | | |
|---|---|---|
| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Eric Cardwell
(74) *Attorney, Agent, or Firm* — Ryan, Mason & Lewis, LLP

(57) ABSTRACT

An apparatus comprises a processing device configured to receive a write request to write a given portion of data to a storage system comprising a multiple-instance write cache, the multiple-instance write cache comprising a first write cache instance that utilizes replica-based data protection and a second write cache instance that utilizes data striping-based data protection, and to determine a size of the given data portion and to compare the size of the given data portion to at least one size threshold. The processing device is also configured, responsive to a first comparison result, to write the given data portion to the first write cache instance. The processing device is further configured, responsive to a second comparison result different than the first comparison result, to write at least part of the given data portion to the second write cache instance.

20 Claims, 6 Drawing Sheets

(56) References Cited

U.S. PATENT DOCUMENTS

| | | | |
|---|---|---|---|
| 10,019,362 B1* | 7/2018 | Chatterjee | G06F 12/0893 |
| 10,078,598 B1 | 9/2018 | Wallace et al. | |
| 10,331,561 B1 | 6/2019 | Shilane et al. | |
| 10,445,180 B2 | 10/2019 | Butterworth et al. | |
| 10,986,174 B1 | 4/2021 | Sharma et al. | |
| 11,119,668 B1 | 9/2021 | Keller et al. | |
| 11,144,399 B1 | 10/2021 | Yarimi et al. | |
| 11,163,479 B2 | 11/2021 | Lieblich et al. | |
| 11,163,699 B2 | 11/2021 | Keller et al. | |
| 11,262,933 B2 | 3/2022 | Matosevich et al. | |
| 11,301,162 B2 | 4/2022 | Matosevich et al. | |
| 11,416,396 B2 | 8/2022 | Shatsky et al. | |
| 11,418,589 B1 | 8/2022 | Spiegelman | |
| 2002/0032835 A1 | 3/2002 | Li et al. | |
| 2008/0021853 A1 | 1/2008 | Modha et al. | |
| 2009/0204761 A1 | 8/2009 | Caprioli et al. | |
| 2009/0276593 A1 | 11/2009 | Jacobson et al. | |
| 2013/0305002 A1 | 11/2013 | Hallak et al. | |
| 2014/0068181 A1* | 3/2014 | Mridha | G06F 11/108 |
| | | | 711/E12.017 |
| 2014/0215147 A1 | 7/2014 | Pan | |
| 2014/0215262 A1 | 7/2014 | Li et al. | |
| 2014/0244935 A1 | 8/2014 | Ezra et al. | |
| 2015/0095696 A1* | 4/2015 | Hess | G06F 11/108 |
| | | | 714/6.24 |
| 2016/0103764 A1 | 4/2016 | Banerjee et al. | |
| 2018/0113640 A1 | 4/2018 | Fernandez et al. | |
| 2018/0267893 A1 | 9/2018 | Barzik et al. | |
| 2018/0300075 A1 | 10/2018 | Fernandez et al. | |
| 2019/0129857 A1* | 5/2019 | Shamis | G06F 12/0824 |
| 2019/0163587 A1 | 5/2019 | Anna et al. | |
| 2019/0227845 A1 | 7/2019 | Sridhar et al. | |
| 2020/0133503 A1 | 4/2020 | Sun et al. | |
| 2021/0279187 A1 | 9/2021 | Puder et al. | |
| 2021/0294505 A1 | 9/2021 | Keller et al. | |
| 2021/0294774 A1 | 9/2021 | Keller et al. | |
| 2021/0294775 A1 | 9/2021 | Keller et al. | |
| 2021/0303160 A1 | 9/2021 | Lieblich et al. | |
| 2021/0303169 A1 | 9/2021 | Tagar et al. | |
| 2021/0303202 A1 | 9/2021 | Ben Zeev et al. | |
| 2021/0303401 A1 | 9/2021 | Yarimi et al. | |
| 2021/0303407 A1 | 9/2021 | Keller et al. | |
| 2021/0303480 A1 | 9/2021 | Keller et al. | |
| 2021/0373796 A1 | 12/2021 | Matosevich et al. | |
| 2022/0004320 A1 | 1/2022 | Matosevich et al. | |
| 2022/0035788 A1 | 2/2022 | Aharoni et al. | |
| 2022/0113867 A1 | 4/2022 | Aharoni et al. | |
| 2022/0114184 A1 | 4/2022 | Sharma et al. | |
| 2022/0116454 A1 | 4/2022 | Aharoni et al. | |
| 2022/0121458 A1 | 4/2022 | Moran et al. | |
| 2022/0129380 A1 | 4/2022 | Shatsky et al. | |
| 2022/0171567 A1 | 6/2022 | Matosevich et al. | |
| 2022/0187991 A1 | 6/2022 | Keller et al. | |
| 2022/0222113 A1 | 7/2022 | Shatsky et al. | |

OTHER PUBLICATIONS

International Search Report and Written Opinion of PCT/US2019/024900 dated Jan. 7, 2020, 12 pages.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting to Know Dell EMC PowerFlex," Version 3.5.x, Rev. 02, Jan. 2021, 66 pages.

Dell EMC, "Dell EMC VxRack Flex," Dell EMC Product Overview, 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell, "PowerVault MD3 SSD Cache Overview," White Paper, 2012, 22 pages.

U.S. Appl. No. 17/236,256 filed in the name of Doron Tal et al. filed Apr. 21, 2021, and entitled "Recovery from Partial Device Error in Data Storage System."

U.S. Appl. No. 17/306,601 filed in the name of Rivka Matosevich et al. filed May 3, 2021, and entitled "Managing Replication Journal in a Distributed Replication System."

U.S. Appl. No. 17/308,166 filed in the name of Adi Bar Shalom et al. filed May 5, 2021, and entitled "Journal Barrier Consistency Determination."

U.S. Appl. No. 17/351,733 filed in the name of Yosef Shatsky et al. filed Jun. 18, 2021, and entitled "Data Deduplication in a Disaggregated Storage System."

U.S. Appl. No. 17/361,666 filed in the name of Yosef Shatsky et al. filed Jun. 29, 2021, and entitled "Tracking Utilization of Data Blocks in a Storage System."

U.S. Appl. No. 17/511,695 filed in the name of Yosef Shatsky et al. filed Oct. 27, 2021, and entitled "Write Cache Management."

* cited by examiner

| INSTANCE | FIRST WRITE CACHE INSTANCE 301 | SECOND WRITE CACHE INSTANCE 303 | DATA STORAGE INSTANCE 305 |
|---|---|---|---|
| USE | WRITE CACHE | WRITE CACHE | DATA |
| PROTECTION | TRIPLICATION | RAID6 (4+2, 4KB STRIPS) | RAID6 (16+2, 16KB STRIPS) |
| WRITE SIZE | <16KB | ≥16KB, <256KB | ≥256KB |
| CONTENT | DATA AND METADATA | DATA AND METADATA | DATA ONLY, METADATA IS WRITTEN TO A WRITE CACHE INSTANCE |
| WRITE AMPLIFICATION | 4.125 (3+1.125) | 2.625 (1.5+1.125) | 1.125 |

MULTIPLE-INSTANCE WRITE CACHE FOR A STORAGE SYSTEM

FIELD

The field relates generally to information processing, and more particularly to storage in information processing systems.

BACKGROUND

Various types of storage systems, including storage systems implementing software-defined storage (SDS) solutions, may be configured to run workloads from multiple different end-users or applications. Different end-users or applications may have different performance and feature requirements for their associated workloads. In some workloads, performance may be most important. In other workloads, capacity utilization or other feature requirements may be most important. There is thus a need for techniques which enable a storage system to offer flexibility in storage offerings for workloads with different performance and feature requirements.

SUMMARY

Illustrative embodiments of the present disclosure provide techniques for implementing a multiple-instance write cache for a storage system.

In one embodiment, an apparatus comprises at least one processing device comprising a processor coupled to a memory. The at least one processing device is configured to perform the steps of receiving a write request to write a given portion of data to a storage system comprising a multiple-instance write cache, the multiple-instance write cache comprising a first write cache instance that utilizes replica-based data protection and at least a second write cache instance that utilizes data striping-based data protection, determining a size of the given data portion, and comparing the size of the given data portion to at least one size threshold. The at least one processing device is also configured to perform the step of, responsive to a first comparison result, writing the given data portion to the first write cache instance that utilizes replica-based data protection. The at least one processing device is further configured to perform the step of, responsive to a second comparison result different than the first comparison result, writing at least part of the given data portion to the second write cache instance that utilizes data striping-based data protection.

These and other illustrative embodiments include, without limitation, methods, apparatus, networks, systems and processor-readable storage media.

BRIEF DESCRIPTION OF THE DRAWINGS

FIG. 4 shows a table of properties for a storage architecture implementing multiple write cache instances in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
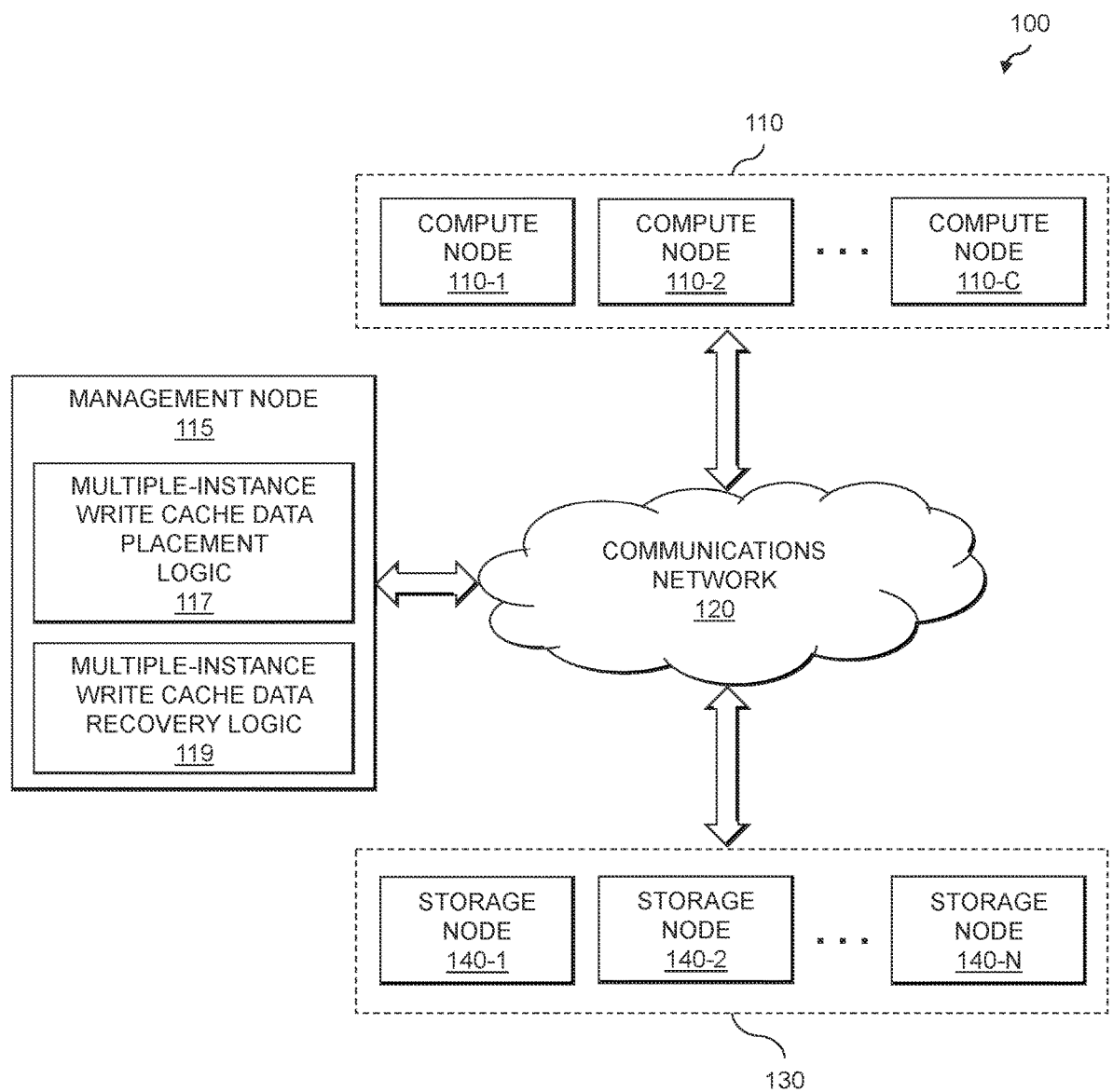
FIGS. 1A and 1B schematically illustrate an information processing system comprising a storage system configured for implementing a multiple-instance write cache for a storage system in an illustrative embodiment.
Figure 1B:
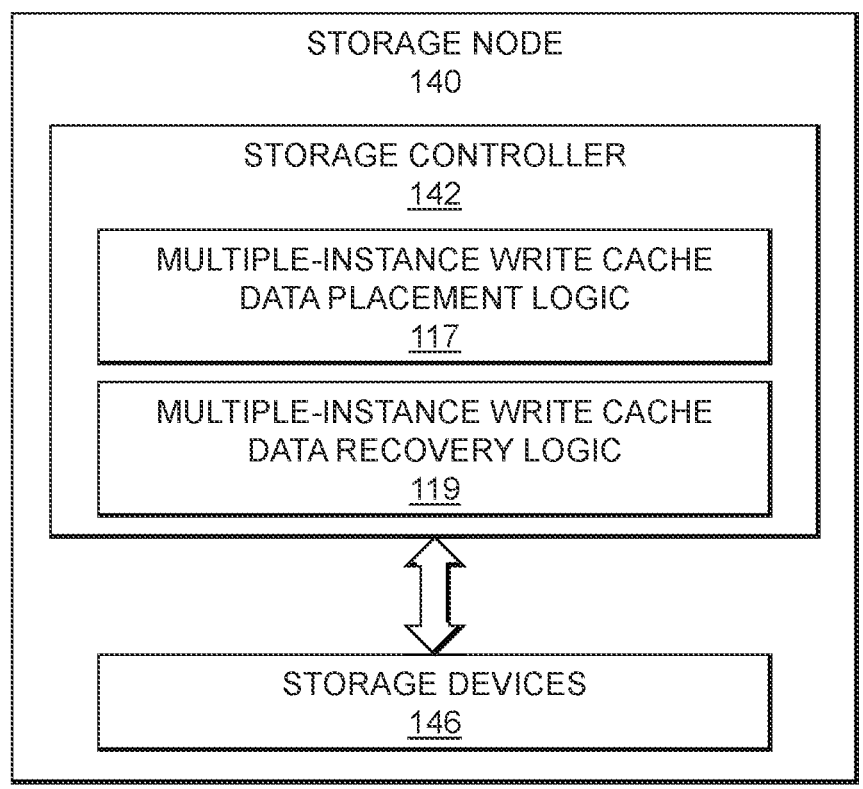

FIGS. 1A and 1B schematically illustrate an information processing system which is configured for reducing write amplification using a storage architecture with a multiple-instance write cache according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement multiple-instance write cache data placement logic 117 and multiple-instance write cache data recovery logic 119 supporting optimization or improvement of IO processing in the data storage system 130 through reduction of write amplification. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement multiple-instance write cache data placement logic 117 and multiple-instance write cache data recovery logic 119 in accordance with the disclosed embodiments, as will be described in further detail below. Various other examples are possible. It is to be noted that the storage controller 142 may include additional modules and other components typically found in conventional implementations of storage controllers and storage systems, although such additional modules and other components are omitted for clarity and simplicity of illustration.

In the embodiment of FIGS. 1A and 1B, the multiple-instance write cache data placement logic 117 and the multiple-instance write cache data recovery logic 119 may be implemented at least in part within the one or more management nodes 115 as well as in one or more of the storage nodes 140 of the data storage system 130. This may include implementing different portions of the multiple-instance write cache data placement logic 117 and the multiple-instance write cache data recovery logic 119 functionality described herein being implemented within the management nodes 115 and the storage nodes 140. In other embodiments, however, the multiple-instance write cache data placement logic 117 and the multiple-instance write cache data recovery logic 119 may be implemented entirely within the management nodes 115 or entirely within the storage nodes 140. In still other embodiments, at least a portion of the functionality of multiple-instance write cache data placement logic 117 and the multiple-instance write cache data recovery logic 119 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue IO requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control 10 access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various function as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (TOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternately separate devices offering the same performance level to gain performance isolation between different sets of storage volumes. For example, the storage systems may separate the "fast" devices into different groups to gain performance isolation between storage volumes on such different groups of the "fast" devices.

Illustrative embodiments provide functionality for optimizing or improving performance of a storage system by reducing write amplification using a multi-instance write cache. While various embodiments are described below with respect to the use of a two-instance write cache (e.g., with a first write cache instance implementing replication-based data protection and a second write cache instance implementing stripe-based data protection), it should be appreciated that more than two instances may be used in a write cache to reduce write amplification (e.g., with a first write cache instance implementing replication-based data protection, and two or more write cache instances implementing strip-based data protection using different-sized stripes). Data storage system 130, as an example, may be configured to support different types of storage having different characteristics (e.g., cost, performance, availability, etc.). By way of example, the above-described "device tiering" may be used to provide different storage tiers with different characteristics (e.g., "fast" devices which are relatively expensive and "slow" devices which are relatively inexpensive). To reduce write amplification, the multiple-instance write cache data placement logic 117 is configured to intelligently select which of multiple-instances of a write cache and data storage that incoming data should be placed on (e.g., on the first instance of the write cache implementing replication-based data protection, on one or more instances of the write cache implementing stripe-based data protection, or on the data storage which may also implement stripe-based data protection with a stripe size different than that utilized in the one or more instances of the write cache implementing stripe-based data protection). The multiple-instance write cache data recovery logic 119 is configured to process the content of the write cache in the case of failure.

An exemplary process for implementing a multiple-instance write cache for a storage system will now be described in more detail with reference to the flow diagram of FIG. 2. It is to be understood that this particular process is only an example, and that additional or alternative processes for implementing a multiple-instance write cache for a storage system may be used in other embodiments.

In this embodiment, the process includes steps 200 through 208. These steps are assumed to be performed using the multiple-instance write cache data placement logic 117 and the multiple-instance write cache data recovery logic 119, which as noted above may be implemented in the management nodes 115 of system 100, in storage nodes 140 of the data storage system 130 of system 100, in compute nodes 110 of system 100, combinations thereof, etc. The process begins with step 200, receiving a write request to write a given portion of data to a storage system comprising a multiple-instance write cache. The multiple-instance write cache comprises a first write cache instance that utilizes replica-based data protection and at least a second write cache instance that utilizes data striping-based data protection. The first write cache instance has a higher write amplification than the second write cache instance.

The storage system further comprises a data storage instance implementing data striping-based data protection. A first stripe size utilized for the second write cache instance is smaller than a second stripe size utilized for the data storage instance. The data striping-based data protection utilized by the data storage instance writes data in stripes each comprising a first number of data blocks and a first number of parity blocks, and the data striping-based data protection utilized by the second write cache instance writes data in stripes each comprising a second number of data blocks and a second number of parity blocks, wherein the second number of data blocks is different than the first number of data blocks. In some embodiments, the replica-based data protection utilized by the first write cache instance comprises a Redundant Array of Independent Disks (RAID) triplication configuration, and the data striping-based data protection utilized by the second write cache instance comprises a RAID6 configuration. In other embodiments, the replica-based data protection utilized by the first write cache instance comprises a RAID duplication configuration, and the data striping-based data protection utilized by the second write cache instance comprises a RAID5 configuration. Various other combinations are possible.

In step 202, a size of the given data portion is determined. Responsive to the size of the given data portion being lower than a first designated size threshold, the given data portion is written to the first write cache instance that utilizes replica-based data protection in step 204. Responsive to the size of the given data portion being greater than or equal to the first designated size threshold and lower than a second designated size threshold, at least part of the given data portion is written to the second write cache instance that utilizes data striping-based data protection in step 206. The part of the given data portion written to the second write cache instance may include an integer multiple of a stripe size utilized by the second write cache instance, with any remainder less than the stripe size utilized by the second write cache instance being stored in the first write cache instance. For example, if the stripe size of the second write cache instance is 16 kilobytes (KB), and the given data portion is 40 KB, then 32 KB may be stored in the second write cache instance while the remaining 8 KB may be stored in the first write cache instance. Responsive to the size of the given data portion being greater than or equal to the second designated size threshold, the given data portion is written to the data storage instance in step 208.

Figure 2:
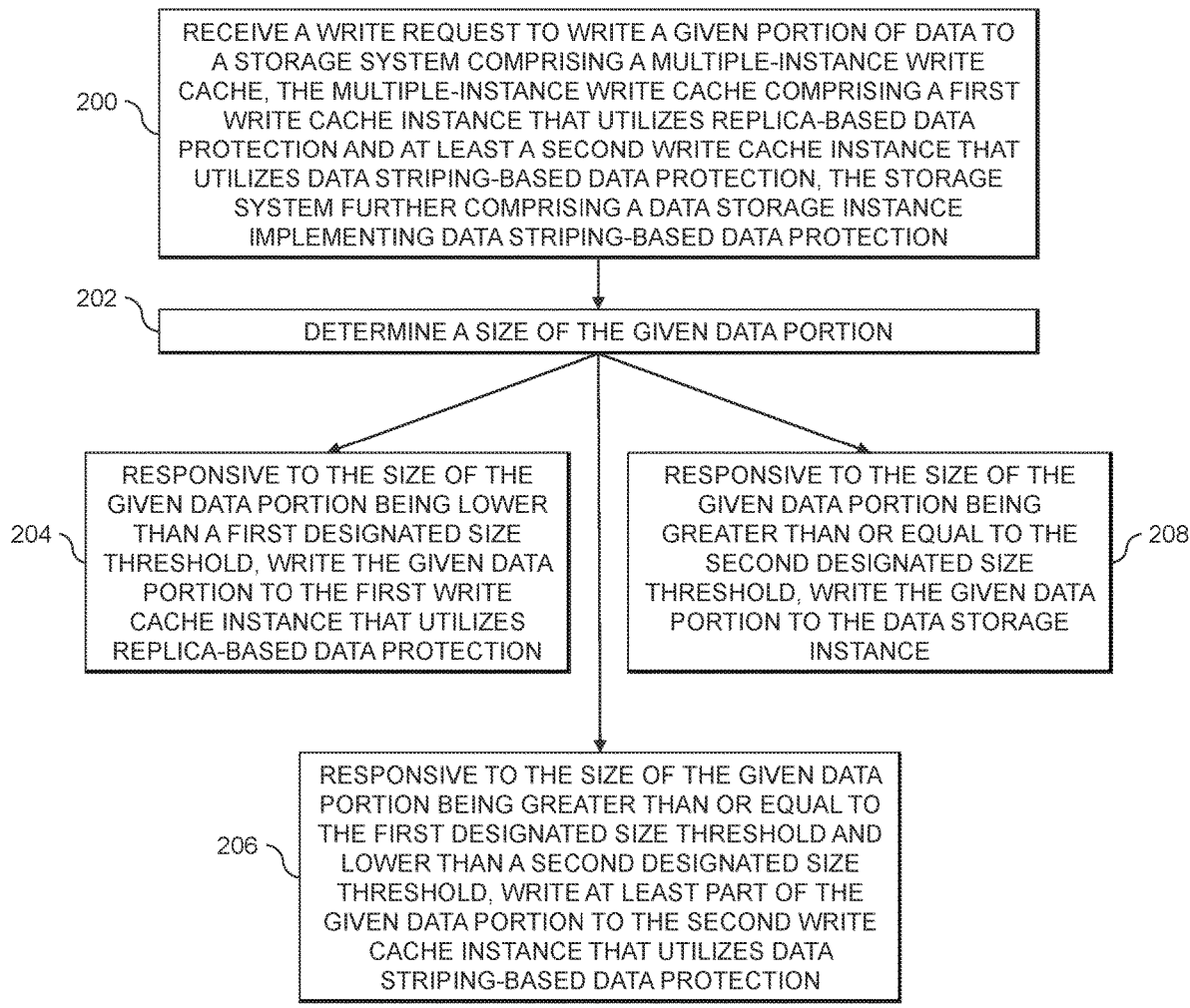
FIG. 2 is a flow diagram of an exemplary process for implementing a multiple-instance write cache for a storage system in an illustrative embodiment.

The FIG. 2 method may further comprise receiving one or more command requests, and storing metadata characterizing the one or more command requests in the first write cache instance. At least one of the one or more command requests may comprise a request to delete data stored in the storage system, or a request to perform deduplication of one or more portions of data stored in the storage system. The FIG. 2 method may also or alternatively comprise maintaining an in-memory copy of the second write cache instance in memory of the storage system.

The given data portion may be stored in a data record associated with a given sequence number. The given sequence number may be utilized for recovering contents of the write cache. The given sequence number characterizes an ordering of writes that have been acknowledged to host devices submitting write requests to the storage system. The given sequence number is part of a set of sequence numbers shared between the first write cache instance and the second write cache instance. The FIG. 2 process may further include recovering data content in the first write cache instance and the second write cache instance in a designated order using the set of sequence numbers shared between the first write cache instance and the second write cache instance.

Storage systems, such as data storage system 130, may implement a write cache that persists data with a minimal delay, which allows return of an acknowledgement to a host (or user) with low latency. The write cache may be stored using persistent memory (PMEM) technology which may be, for example, non-volatile dual in-line memory module (NVDIMM) based random-access memory (RAM), vaulting (e.g., battery-backed random-access memory (BBRAM) that is dumped to a device upon failure), Intel® Optane™ memory, etc. In SDS systems and in low-end systems, PMEM may not be available. In such cases, instead of persisting the write cache to PMEM, it must be persisted to storage devices which are slower than PMEM and have layout restrictions.

A write cache may contain both user data and metadata. Certain entries in the write cache may be metadata only, such as deletion (e.g., unmap) commands, commands to create deduplication, etc. Since writes to the write cache are acknowledged to the host, it must also be capable of serving reads. To serve reads, the write cache must support a form of lookup capability. This is a RAM-based structure that provides random access to the write cache's content.

Another purpose of a write cache is to accumulate "enough" data to be written efficiently to backend storage. This is relevant in various use cases, including where the backend storage is made of relatively "slow" storage devices (e.g., HDDs, quad-level cell (QLC) drives, etc.), where it is desired to fill a full stripe in a Redundant Array of Independent Disks (RAID) storage configuration (e.g., RAID5, RAID6, etc.) implemented in the backend storage, etc. Assume that a storage architecture uses RAID6 to store data, and strives to perform full stripe writes for best performance. The RAID set includes N data blocks and M check or parity blocks, expressed as N+M. By way of non-limiting example, assume a stripe size of 256 KB, such as 8+2 with strips of 32 KB, or 16+2 with strips of 16 KB. Further assume that there is no PMEM available in the storage system, only standard SSDs (e.g., triple-layer cell (TLC) SSDs). Even though the latency motivation is not a significant concern in this scenario, the motivation to perform full stripe writes remains.

For cases in which PMEM is not available, an approach may be used which creates a dual RAID geometry on the same SSDs. This ability is used to create two RAID instances, a duplication or triplication instance (e.g., that does not suffer from the full stripe write problem) used for the write cache, and a RAID6 instance that is used for data storage. Such an approach, however, leads to a write cache with high write amplification that shortens the lifetime of SSDs (e.g., due to inherent endurance limitations of SSDs). The write amplification is 3× for triplication writes to the write cache, plus 1× and a bit for writes to the RAID6 instance used for data storage, with a total write amplification>4×. This would not be a significant problem if the RAID6 instance used for data storage were to use a relatively small stripe size, but there are often various considerations that lead to selection of a larger stripe size for the RAID6 instance used for data storage. Such considerations include, but are not limited to, that better capacity efficiency is achieved when wider geometries (e.g., larger stripe sizes) are used. Another consideration is that smaller stripes require more metadata for managing each stripe and its state. Yet another consideration is that typical stripes are filled with data chunks that are 4 KB-64 KB, such that small stripes will lead to remaining space in the stripe that wastes capacity. This is often the result of compression or embedded headers that are added to the chunks and lead to misalignment.

Some approaches for reducing write amplification include compressing data before it is written to the write cache, and supporting "write through." Write though allows larger user writes that fill a stripe to be written directly to a data storage instance. This will typically be a relatively large chunk of data (e.g., 256 KB). An additional write to the write cache instance is still required to persist metadata.

Illustrative embodiments provide technical solutions for reducing write amplification through the use of a multiple-instance write cache. The multiple-instance write cache includes a first write cache instance that implements replica-based data protection (e.g., duplication or triplication RAID), as well as at least a second write cache instance that implements data striping-based data protection (e.g., RAID5, RAID6, etc.). In some cases, multiple write cache instances that implement data striping-based data protection are used, such as two or more write cache instances that utilize different stripe sizes. The multiple-instance write cache is part of a storage architecture which also includes a data storage instance. The data storage instance may also implement data striping-based data protection (e.g., RAID5, RAID6, etc.) with a wider stripe size than that used by the data striping-based data protection write cache instances.

Figure 3:
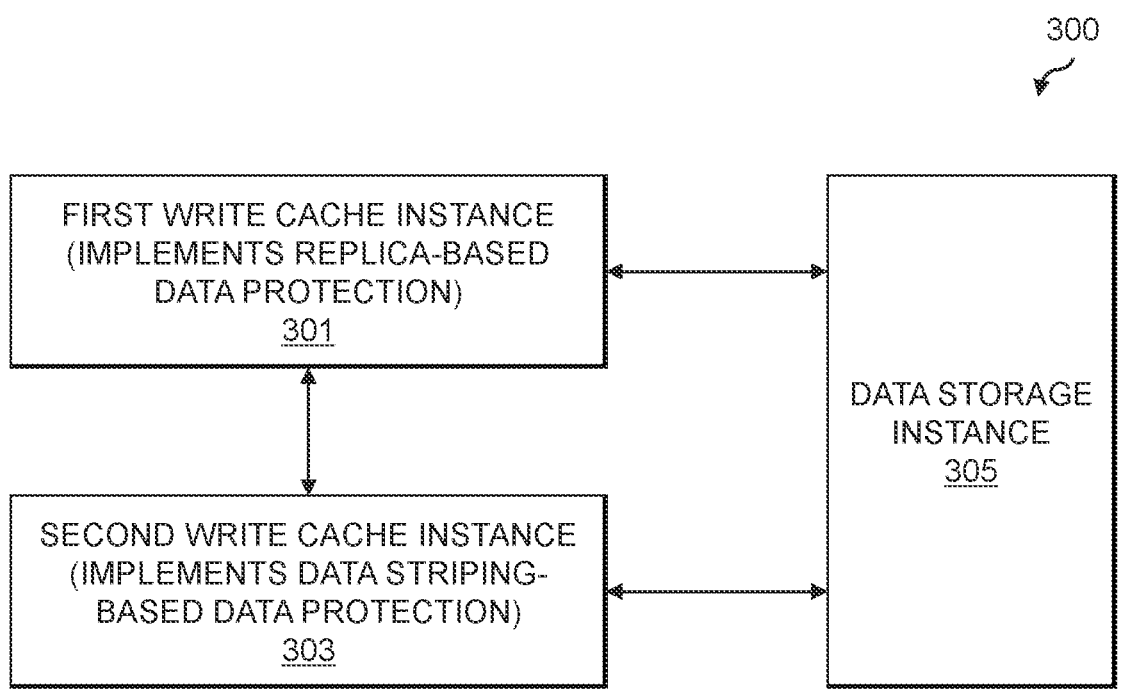
FIG. 3 shows a storage architecture with multiple write cache instances in an illustrative embodiment.

FIG. 3 shows an example of a storage architecture 300 implementing a multiple-instance write cache including a first write cache instance 301, a second write cache instance 303, and a data storage instance 305. The first write cache instance 301 implements replica-based data protection, and the second write cache instance 303 implements data striping-based data protection. FIG. 4 shows a table 400 showing an example configuration of the first write cache instance 301, the second write cache instance 303 and the data storage instance 305. As shown in the table 400, the first write cache instance 301 is used as a write cache, implements triplication protection (e.g., double failure fault tolerance), is used for write sizes less than 16 KB, has both data and metadata content, and has a write amplification of 4.125 (3+1.125 for destage to RAID6 using an 8+2 geometry). The second write cache instance 303 is also used as a write cache, but implements RAID6 protection with a stripe size of 16 KB (e.g., 4+2 and 4 KB strip size), is used for writes with sizes greater than or equal to 16 KB and less than 256 KB, has both data and metadata content, and has a write amplification of 2.625 (1.5+1.125). The data storage instance 305 is used for data, implements RAID6 protection with a stripe size of 256 KB (e.g., 16+2 and 16 KB strip size), is used for writes with sizes greater than or equal to 256 KB, has data content only (though metadata is still written to a write cache instance), and has a write amplification of 1.125. In some embodiments, the metadata is not included in the direct write to the data storage instance 305. The metadata, however, may eventually be removed from the write cache. In some embodiments, the metadata is written to a metadata storage instance. In other embodiments, the metadata may be written to the data storage instance 305, but as a post process, not as part of the writethrough.

It should be noted that the particular values given in the table 400 are presented by way of example only, and that embodiments are not limited to these particular values. For example, the second write cache instance 303 may use stripe sizes other than 16 KB and the data storage instance 305 may use stripe sizes other than 256 KB, so long as the stripe size used for the second write cache instance 303 is smaller than the stripe size used for the data storage instance 305. As another example, instead of double failure fault tolerance, the different instances may implement single failure fault tolerance (e.g., duplication for the write cache instance 301, and RAID5 for both the second write cache instance 303 and the data storage instance 305). It is also possible to use combinations of single and double failure fault tolerance (e.g., duplication for the write cache instance 301 but RAID6 for one or both of the second write cache instance 303 and the data storage instance 305, triplication for the write cache instance 301 but RAID5 for one or both of the second write cache instance 303 and the data storage instance 305, etc.).

The technical solutions described herein implement a multiple-instance write cache that includes at least one relatively "small" stripe size data striping-based write cache instance (e.g., a small stripe RAID6 write cache). Here, "small" refers to using a stripe size that is smaller than that used in a backend storage instance.

In the storage architecture 300, the first write cache instance 301 may be a triplication write cache that is not restricted by full stripe writes. The first write cache instance 301 can therefore write at a logical block address (LBA) granularity. The data storage instance 305 uses a data appropriate RAID geometry (e.g., RAID6 with a 256 KB stripe size), and has no need to factor in write cache restrictions. The second write cache instance 303 fills the "gap" between the large stripe size of the data storage instance 305 and the high write amplification of the first write cache instance 301 (e.g., the triplication write cache). To keep the stripe size small, few and small strips are used in the second write cache instance 303. When using the second write cache instance 303, only very small writes go to the first write cache instance 301 (e.g., writes less than 16 KB, or more generally writes less than the stripe size of the second write cache instance 303). Since in real-life workloads most of the bandwidth comes from larger writes, the remaining writes to the triplication instance become negligible from an endurance perspective.

Another advantage of the multiple-instance write cache technical solutions described herein is that such solutions reduce the amount of data sent over the network in distributed storage systems. The multiple-instance write cache technical solutions, however, does increase the number of messages from 3 (e.g., for triplication) to 6 (e.g., for 4+2 RAID6 geometry) per stripe.

The first write cache instance 301 (e.g., the triplication write cache) has the ability to always have a local copy. This is most efficient when it is required to read the content of the write cache before de-staging. The second write cache instance 301 (e.g., a RAID6 based write cache) does not have this ability, and thus it is recommended to hold a copy of the content of the second write cache instance 303 in memory (e.g., RAM) to avoid the read requirement during de-staging.

A key aspect to address for multiple-instance write cache configuration is how to process the content of the write cache in the case of failure. In some implementations, the RAM is recovered as-is by means of vaulting and thus there is no issue. In other implementations, a process of re-scanning the content of the write cache is used to recreate the RAM structures. This scan must be done in the same order as it was created. In such an implementation, the recovery process scans each of the write cache instances (e.g., both the first write cache instance 301 and the second write cache instance 303), but the ordering requirement remains and must be solved. The order of recovery must be the same as the order of acknowledgments sent to the host or user. To achieve this, in some embodiments a sequence number is used to label every write to the multiple write cache instances.

In the storage architecture 300, the first write cache instance 301 and the second write cache instance 303 share a same sequence number—every time a record is written to either the first write cache instance 301 or the second write cache instance 303, the joint sequence number is incremented and is written as part of the record. Writes to both the first write cache instance 301 and the second write cache instance 303 may be concurrent, and the one with the higher sequence number may return before the write with the lower sequence number. When writing to the write cache, acknowledgments are sent to the host or user in the same order as the sequence number. When this happens, the process and acknowledgement to the host or user of the higher sequence number record waits for the lower sequence number record to complete. This mechanism provides a globally-defined order for all cache entries in both the first write cache instance 301 and the second write cache instance 303. When recovering from the write cache, both the first write cache instance 301 and the second write cache instance 303 are read in parallel. The record with the lower sequence number of the two is the one that is processed first, in a behavior that is similar to a merge operation.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Figure 5:
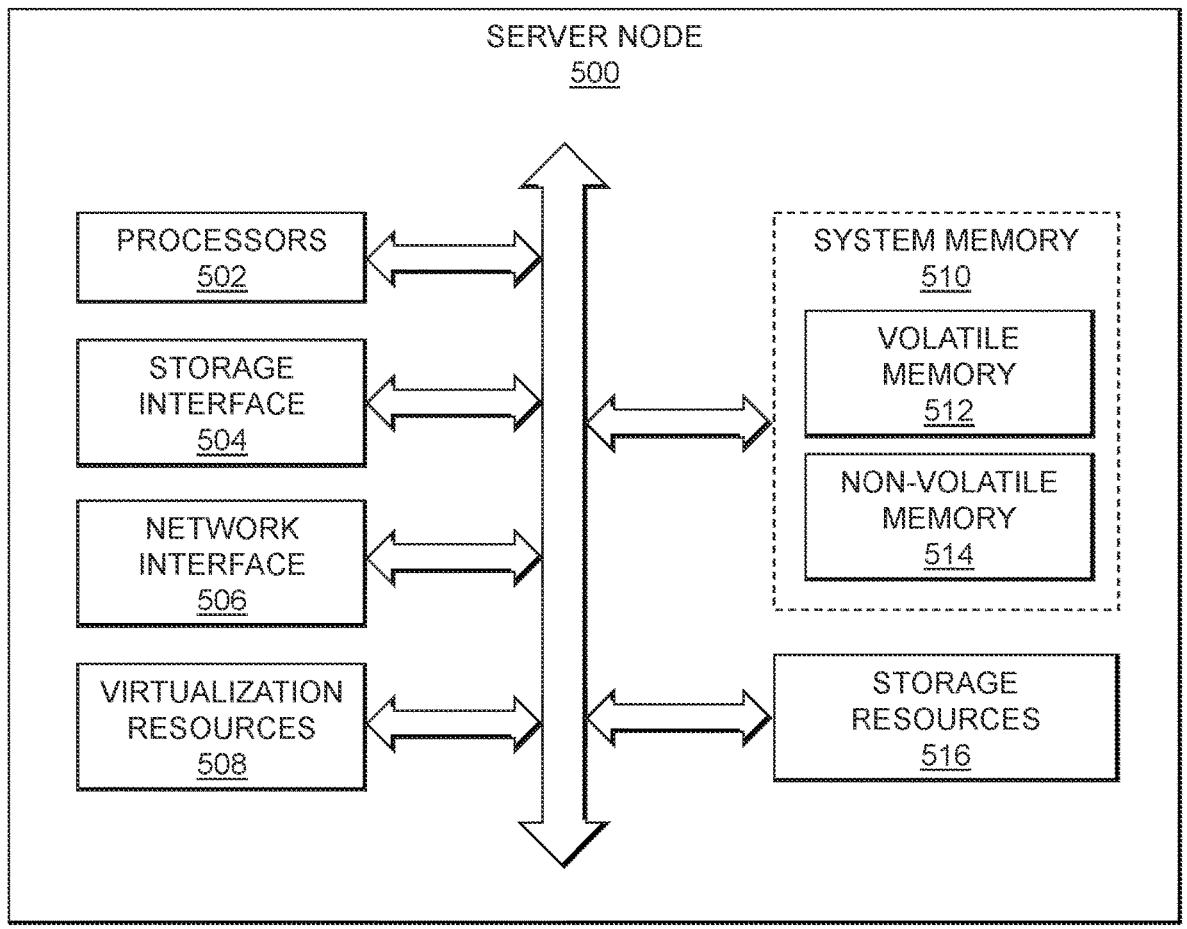
FIG. 5 schematically illustrates a framework of a server node for implementing a storage node which hosts logic for implementing a multiple-instance write cache in an illustrative embodiment.

FIG. 5 schematically illustrates a framework of a server node (or more generally, a compute node) for hosting logic for efficient garbage collection processing according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more service or functions which are hosted by the server node 500. For example, the virtualization resources 508 can be configured to implement the various modules and functionalities of the multiple-instance write cache data placement and data recovery logic as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the multiple-instance write cache data placement logic 117 and the multiple-instance write cache data recovery logic 119, comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile memory 512 is configured as the highest-level memory tier, and the non-volatile memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a write request to write a given portion of data to a storage system comprising a multiple-instance write cache and a data storage instance, the multiple-instance write cache comprising a first write cache instance that utilizes replica-based data protection and at least a second write cache instance that utilizes data striping-based data protection;
determining a size of the given data portion;
comparing the size of the given data portion to at least one size threshold; and
responsive to a first comparison result, writing the given data portion to the first write cache instance that utilizes replica-based data protection prior to writing the given data portion to the data storage instance; and
responsive to a second comparison result different than the first comparison result, writing at least part of the given data portion to the second write cache instance that utilizes data striping-based data protection instead of the first write cache instance and prior to writing the given data portion to the data storage instance.

2. The apparatus of claim 1 wherein the data storage instance implements data striping-based data protection.

3. The apparatus of claim 2 wherein a first stripe size utilized for the second write cache instance is smaller than a second stripe size utilized for the data storage instance.

4. The apparatus of claim 2 wherein the data striping-based data protection utilized by the data storage instance writes data in stripes each comprising a first number of data blocks and a first number of parity blocks, and wherein the data striping-based data protection utilized by the second write cache instance writes data in stripes each comprising a second number of data blocks and a second number of parity blocks, wherein the second number of data blocks is different than the first number of data blocks.

5. The apparatus of claim 2 wherein the at least one processing device is further configured to perform the step of, responsive to a third comparison result different than the first and second comparison results, writing the given data portion directly to the data storage instance bypassing the first write cache instance and the second write cache instance.

6. The apparatus of claim 5 wherein:
the at least one size threshold comprises a first size threshold and a second size threshold;
the first comparison result comprises determining that the size of the given data portion is less than the first size threshold;
the second comparison result comprises determining that the size of the given data portion is greater than or equal to the first size threshold and less than the second size threshold; and
the third comparison result comprises determining that the size of the given data portion is greater than or equal to the second size threshold.

7. The apparatus of claim 1 wherein:
the replica-based data protection utilized by the first write cache instance comprises one of a Redundant Array of Independent Disks (RAID) triplication configuration and a RAID duplication configuration; and
the data striping-based data protection utilized by the second write cache instance comprises one of a RAID6 configuration and a RAID5 configuration.

8. The apparatus of claim 1 wherein the at least one processing device is further configured to perform the step of receiving one or more command requests, and storing metadata characterizing the one or more command requests in the first write cache instance.

9. The apparatus of claim 8 wherein at least one of the one or more command requests comprises a request to delete data stored in the storage system.

10. The apparatus of claim 8 wherein at least one of the one or more command requests comprises a request to perform deduplication of one or more portions of data stored in the storage system.

11. The apparatus of claim 1 wherein the at least one processing device is further configured to perform the step of maintaining an in-memory copy of the second write cache instance in memory of the storage system.

12. The apparatus of claim 1 wherein the first write cache instance has a higher write amplification than the second write cache instance.

13. The apparatus of claim 1 wherein the given data portion is stored in a data record associated with a given sequence number, the given sequence number characterizing an ordering of writes that have been acknowledged to host devices submitting write requests to the storage system, the given sequence number being part of a set of sequence numbers shared between the first write cache instance and the second write cache instance.

14. The apparatus of claim 13 wherein the at least one processing device is further configured to perform the step of recovering data content in the first write cache instance and the second write cache instance in a designated order using the set of sequence numbers shared between the first write cache instance and the second write cache instance.

15. A computer program product comprising a non-transitory processor-readable storage medium having stored therein program code of one or more software programs, wherein the program code when executed by at least one processing device causes the at least one processing device to perform steps of:
receiving a write request to write a given portion of data to a storage system comprising a multiple-instance write cache and a data storage instance, the multiple-instance write cache comprising a first write cache instance that utilizes replica-based data protection and at least a second write cache instance that utilizes data striping-based data protection;
determining a size of the given data portion;
comparing the size of the given data portion to at least one size threshold;
responsive to a first comparison result, writing the given data portion to the first write cache instance that utilizes replica-based data protection prior to writing the given data portion to the data storage instance; and
responsive to a second comparison result different than the first comparison result, writing at least part of the given data portion to the second write cache instance that utilizes data striping-based data protection instead of the first write cache instance and prior to writing the given data portion to the data storage instance.

16. The computer program product of claim 15 wherein the data storage instance implements data striping-based data protection, and wherein a first stripe size utilized for the second write cache instance is smaller than a second stripe size utilized for the data storage instance.

17. The computer program product of claim 16 wherein the program code when executed by the at least one processing device further causes the at least one processing device to perform the step of, responsive to a third comparison result different than the first and second comparison results, writing the given data portion directly to the data storage instance bypassing the first write cache instance and the second write cache instance.

18. A method comprising:
receiving a write request to write a given portion of data to a storage system comprising a multiple-instance write cache and a data storage instance, the multiple-instance write cache comprising a first write cache instance that utilizes replica-based data protection and at least a second write cache instance that utilizes data striping-based data protection;
determining a size of the given data portion;
comparing the size of the given data portion to at least one size threshold;
responsive to a first comparison result, writing the given data portion to the first write cache instance that utilizes replica-based data protection prior to writing the given data portion to the data storage instance; and
responsive to a second comparison result different than the first comparison result, writing at least part of the given data portion to the second write cache instance that utilizes data striping-based data protection instead of the first write cache instance and prior to writing the given data portion to the data storage instance;
wherein the method is performed by at least one processing device comprising a processor coupled to a memory.

19. The method of claim 18 wherein the data storage instance implements data striping-based data protection, and wherein a first stripe size utilized for the second write cache instance is smaller than a second stripe size utilized for the data storage instance.

20. The method of claim 19 further comprising, responsive to a third comparison result different than the first and second comparison results, writing the given data portion directly to the data storage instance bypassing the first write cache instance and the second write cache instance.

\* \* \* \* \*